US011169679B2

(12) United States Patent
Okumura et al.

(10) Patent No.: US 11,169,679 B2
(45) Date of Patent: *Nov. 9, 2021

(54) DISPLAY APPARATUS TO CONTROL CONNECTION, A DISPLAY METHOD AND A NON-TRANSITORY COMPUTER READABLE MEDIUM

(71) Applicant: SONY CORPORATION, Tokyo (JP)

(72) Inventors: Mitsuo Okumura, Tokyo (JP);
Hirofumi Hibi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,680

(22) Filed: Jan. 28, 2019

(65) Prior Publication Data

US 2019/0187886 A1    Jun. 20, 2019

Related U.S. Application Data

(63) Continuation of application No. 15/102,083, filed as application No. PCT/JP2015/001425 on Mar. 13, 2015, now Pat. No. 10,241,666.

(30) Foreign Application Priority Data

Apr. 2, 2014    (JP) .................................. 2014-076424

(51) Int. Cl.
*G06F 3/048*    (2013.01)
*G06F 3/0484*    (2013.01)
(Continued)

(52) U.S. Cl.
CPC .......... *G06F 3/04847* (2013.01); *G06F 3/048* (2013.01); *G06F 3/0482* (2013.01);
(Continued)

(58) Field of Classification Search
CPC .. G06F 3/048; G06F 3/04847; G06F 3/04817; G06F 3/0482; G06F 3/04842; G06F 3/04845; G06F 3/0486; H04H 60/04
See application file for complete search history.

(56) References Cited

U.S. PATENT DOCUMENTS 6,519,540 B1    2/2003  Salandro
6,665,004 B1 *  12/2003  Paff .................. G08B 13/19645
                                                    348/156
(Continued)

FOREIGN PATENT DOCUMENTS

CA    2 718 360 A1    1/2011
EP    1 703 728 A2    9/2006
(Continued)

OTHER PUBLICATIONS

International Search Report dated Aug. 21, 2015, in PCT/JP2015/001425 Filed Mar. 13, 2015.
(Continued)

*Primary Examiner* — Mahelet Shiberou
(74) *Attorney, Agent, or Firm* — Oblon, McClelland, Maier & Neustadt, L.L.P.

(57) ABSTRACT

A display apparatus that includes circuitry that displays a user interface screen including device information that identifies a plurality of output device groups and a plurality of input device groups to control connection between one of the output device groups and one of the input device groups; and receives an input that designates a combination of said one of the output device groups and said one of the input device groups, the user interface screen includes a matrix comprising a plurality of cells in a row direction and a column direction, the input designates the combination by designating one of grouped cells corresponding to the combination of said one of the output device groups and said one
(Continued)

of the input device groups in the matrix, and the grouped cells are grouped such that the input designates the combination as a group.

15 Claims, 8 Drawing Sheets

(51) Int. Cl.
  *H04H 60/04* (2008.01)
  *G06F 3/0481* (2013.01)
  *G06F 3/0482* (2013.01)
  *G06F 3/0486* (2013.01)

(52) U.S. Cl.
  CPC ........ *G06F 3/0486* (2013.01); *G06F 3/04817* (2013.01); *G06F 3/04842* (2013.01); *G06F 3/04845* (2013.01); *H04H 60/04* (2013.01)

(56) References Cited

U.S. PATENT DOCUMENTS

| | | | |
|---|---|---|---|
| 7,221,357 B2 | 5/2007 | Von Essen et al. | |
| 8,643,855 B2* | 2/2014 | Ushiku | G06F 3/1288 358/1.13 |
| 9,602,359 B2* | 3/2017 | Mau | H04L 41/22 |
| 2002/0171624 A1* | 11/2002 | Stecyk | H04L 12/282 345/156 |
| 2003/0160781 A1* | 8/2003 | Berndt | G06T 11/206 345/419 |
| 2004/0055006 A1* | 3/2004 | Iwamura | H04N 5/44 725/37 |
| 2006/0146184 A1 | 7/2006 | Gillard et al. | |
| 2009/0282437 A1* | 11/2009 | Malec | G06F 3/1423 725/40 |
| 2010/0313127 A1 | 12/2010 | Gosper et al. | |
| 2012/0102432 A1 | 4/2012 | Breedvelt-Schouten et al. | |
| 2013/0080955 A1 | 3/2013 | Reimann | |
| 2013/0204967 A1* | 8/2013 | Seo | H04L 67/303 709/217 |
| 2015/0077781 A1* | 3/2015 | Asai | H04N 1/00389 358/1.13 |
| 2015/0286360 A1* | 10/2015 | Wachter | G06F 3/14 345/173 |

FOREIGN PATENT DOCUMENTS

| | | |
|---|---|---|
| JP | 2002-314879 A | 10/2002 |
| JP | 2004-32041 A | 1/2004 |
| JP | 2004-172876 A | 6/2004 |
| JP | 2006-516372 A | 6/2006 |
| JP | 2010-124487 A | 6/2010 |

OTHER PUBLICATIONS

Office Action dated Oct. 17, 2017 in European Patent Application No. 15 719 295.6.
Office Action dated Dec. 12, 2017 in Japanese Patent Application No. 2014-076424.
Extended European Search Report dated Apr. 3, 2018 in corresponding European Patent Application No. 17203031.4.
Decision to refuse dated Aug. 14, 2019 in European Patent Application No. 15 719 295.6, 41 pages.

* cited by examiner

DISPLAY APPARATUS TO CONTROL CONNECTION, A DISPLAY METHOD AND A NON-TRANSITORY COMPUTER READABLE MEDIUM

CROSS-REFERENCE TO RELATED APPLICATIONS

This application is a continuation of U.S. application Ser. No. 15/102,083, filed Jun. 6, 2016, which claims priority from International Application No. PCT/JP2015/001425, filed Mar. 13, 2015, which is based upon and claims the benefit of priority from Japanese Priority Patent Application JP 2014-076424 filed on Apr. 2, 2014, the entire contents of which are incorporated herein by reference.

TECHNICAL FIELD

The present technique relates to a connection control apparatus and a connection control method, and more particularly, to a connection control apparatus and a connection control method for controlling connection between a source device and a destination device connected to a network.

BACKGROUND ART

In the past, in a studio and the like, it is known to connect a source device for outputting a video signal and a destination device for receiving a video signal and recording and displaying the video signal via a network such as Ethernet, and to control connection between the source device and the destination device using a personal computer, a tablet, and the like connected to the network. Examples of source devices include a camera, a video playback device, and the like, and examples of destination devices include a monitor, a video recording device, and the like.

It is considered to configure to allow such connection control to be easily performed on a user interface screen for operating connection between any given source device and destination device chosen from a predetermined number of source devices and destination devices. For example, PTL 1 indicates that, on the user interface screen, multiple source devices (input resources) are arranged in one of the row/column directions and multiple destination devices (output resources) are arranged in the other direction thereof, and when a user designates a cross point (cross point), a desired connection can be achieved.

CITATION LIST

Patent Literature

[PTL 1]
JP 2004-032041A

SUMMARY

Technical Problem

It is an object of the present technique to improve the user's convenience in connection operation using a user interface screen.

Solution to Problem

The present disclosure provides a display apparatus that includes circuitry configured to: display a user interface screen including device information that identifies a plurality of output device groups and a plurality of input device groups, each said output device group including one or more output devices configured to output signals, each said input device group including one or more input devices configured to receive the signals output by the output devices, and the user interface screen being to control connection between one of the output device groups and one of the input device groups; and receive an input that designates a combination of said one of the output device groups and said one of the input device groups from among the plurality of the output device groups and the plurality of the input device groups, the user interface screen includes a matrix comprising a plurality of cells in a row direction and a column direction, each of the plurality of cells corresponding to a combination of one said output device and one said input device in the matrix, the input designates the combination of said one of the output device groups and said one of the input device groups by designating one of grouped cells corresponding to the combination of said one of the output device groups and said one of the input device groups in the matrix, and the grouped cells are grouped such that the input designates the combination of said one of the output device groups and said one of the input device groups as a group.

Advantageous Effects

According to the present technique, the user's convenience can be improved in the connection operation using the user interface screen. The advantageous effects described here are not particularly limited, and any of the advantageous effects described in the present disclosure may be achieved.

DESCRIPTION OF EMBODIMENTS

Hereinafter, a mode for carrying out the disclosure (hereinafter referred to as "embodiment") will be explained. The explanation will be made in the following order.
1. Embodiment
2. Modification

1. Embodiment

[Video System]

Figure 1:
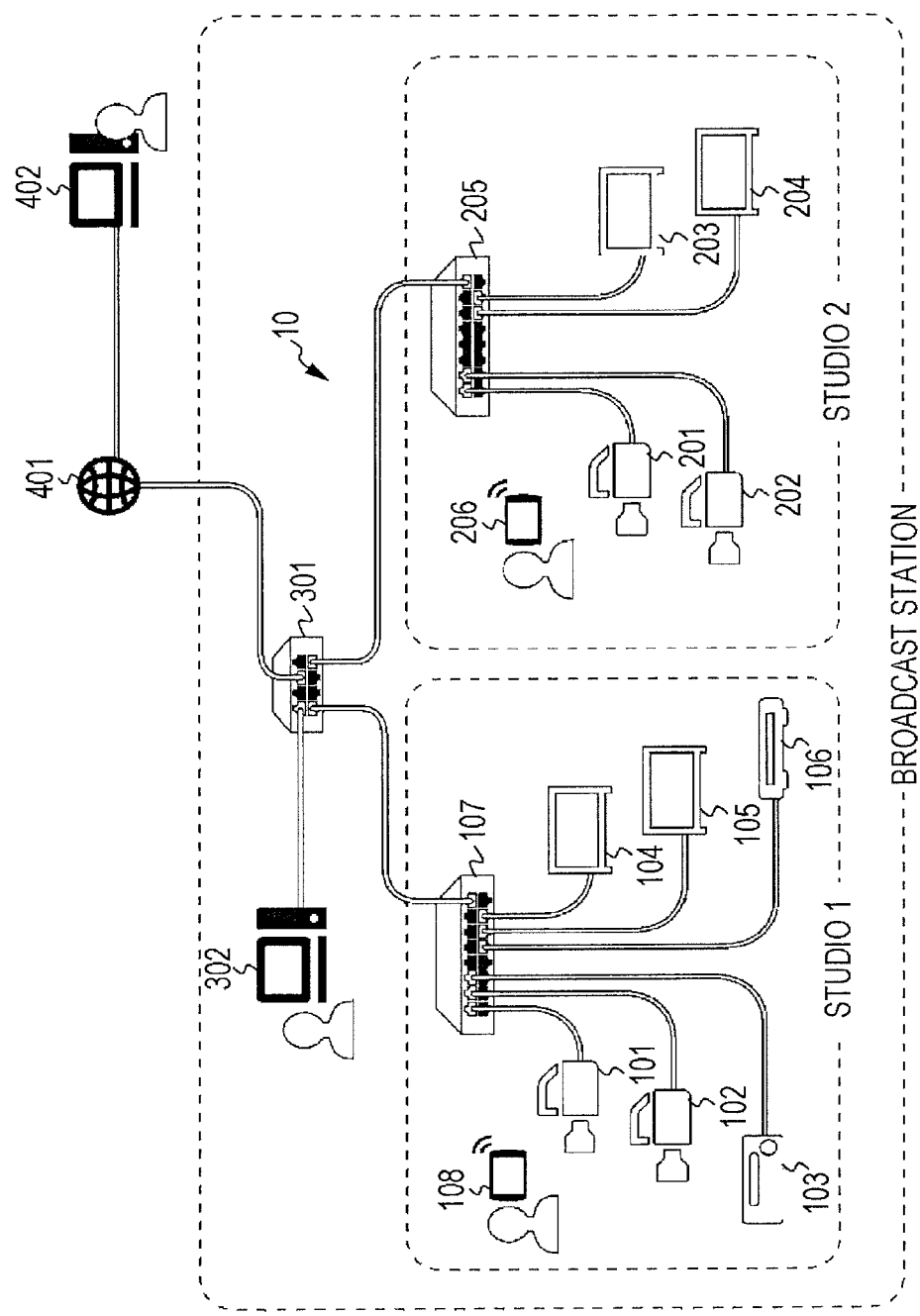
FIG. 1 is a block diagram illustrating an example of a configuration of a video system serving as an embodiment.

FIG. 1 illustrates an example of configuration of a video system 10 in a broadcast station according to an embodiment. This video system 10 includes a source device and a destination device provided within a studio 1 and a source device and a destination device provided in a studio 2. Each device is connected to a network in the broadcast station. In this case, the source device is a video device outputting a video signal, and the source device corresponds to, for example, a video playback device such as a camera, a VTR, and the like. The destination device is a video device that receives, records, and displays a video signal, and the destination device corresponds to, for example, a video recording device such as a monitor, a video server, and the like.

Cameras 101, 102, a video playback device 103, monitors 104, 105, a video recording device 106, and a switching hub 107 are disposed in the studio 1. Each of the devices, i.e., the cameras, the video playback device, the monitors, and the video recording device, is connected via a network cable to the switching hub 107. Cameras 201, 202, monitors 203, 204, and a switching hub 205 are disposed in the studio 2. Each of the devices, i.e., the cameras and the monitors, is connected via a network cable to the switching hub 205. A switching hub 301 is disposed outside of the studio 1 and the studio 2. The switching hub 107 in the studio 1 and the switching hub 205 in the studio 2 are connected via network cables to the switching hub 301.

The control of the connection between the source device and the destination device in this video system 10 is enabled when the connection control apparatus accesses the network in the broadcast station. The connection control apparatus is constituted by, for example, a personal computer, a tablet, and the like. In the example as shown in the drawing, a tablet 108 used by, e.g., a camera operator and a director is shown in the studio 1. In the example as shown in the drawing, a tablet 206 used by, e.g., a camera operator and a director is shown in the studio 2. These tablets 108, 206 are connected wirelessly to the network in the broadcast station.

In the example as shown in the drawing, a personal computer 302 used by, e.g., a director and connected via a network cable to the switching hub 301 outside of the studio 1 and the studio 2 is shown. In the example as shown in the drawing, a personal computer 402 used by, e.g., a director, connected via a network cable to the switching hub 301 via the Internet 401 outside of the broadcast station is shown.

The connection control apparatus (the tablets 108, 206 and the personal computers 302, 402) displays, on a monitor or a display unit, a user interface screen for operating a connection by designating a combination of any given source device and destination device from among a predetermined number of source devices and a predetermined number of destination devices connected to the network in the broadcast station. Then, the connection control apparatus controls the designated combination of the source device and the destination device to be connected on the basis of operation with the user interface screen.

Figure 2:
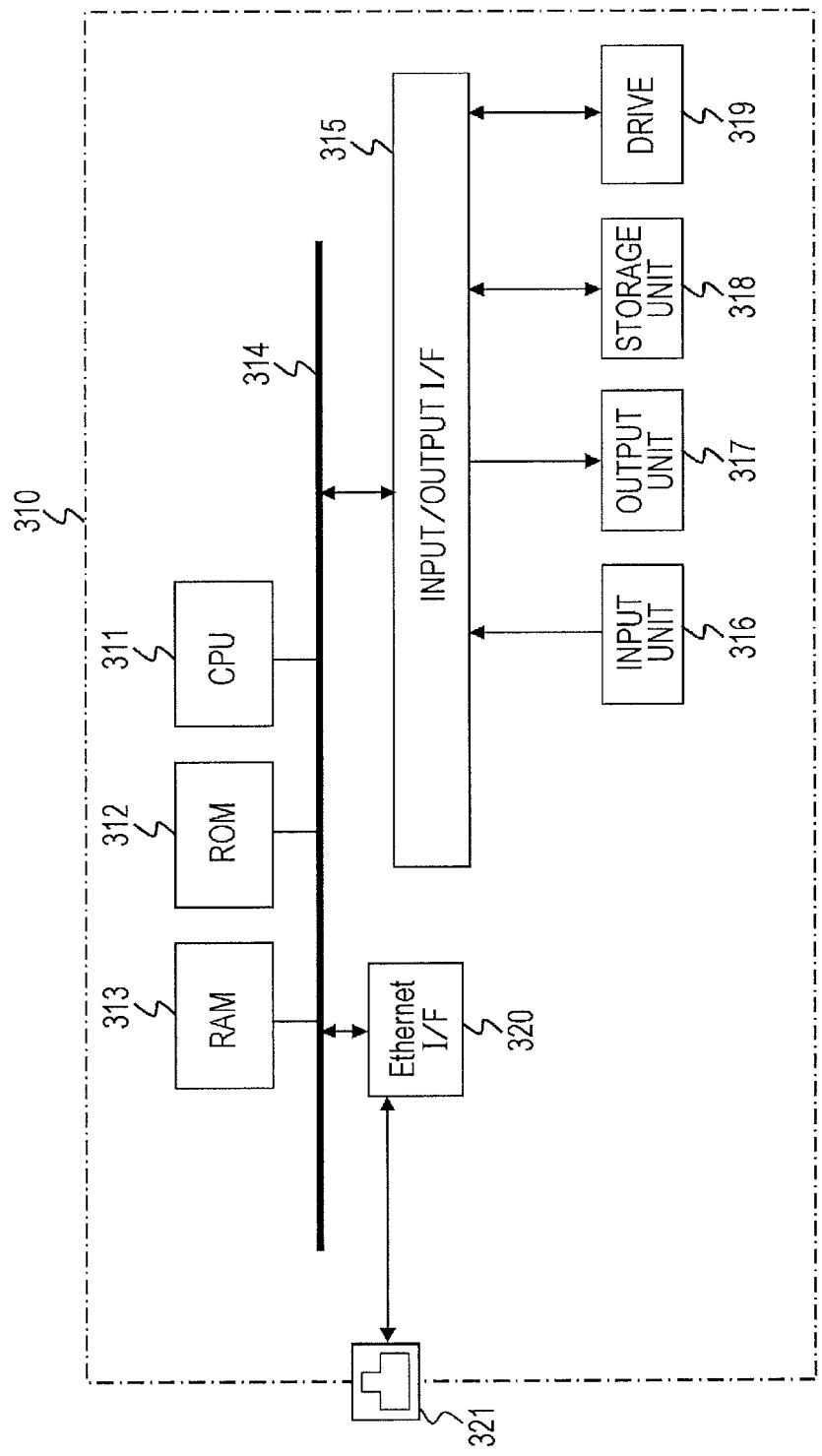
FIG. 2 is a block diagram illustrating an example of a configuration of a personal computer constituting a connection control apparatus.

FIG. 2 illustrates an example of configuration of a personal computer 310 serving as a connection control apparatus. It should be noted that the configuration of the tablet is substantially in the same configuration as the personal computer, and therefore, explanation thereabout is omitted.

The personal computer 310 includes a CPU (Central Processing Unit) 311, a ROM (Read Only Memory) 312, a RAM (Random Access Memory) 313, a bus 314, an input and output interface 315, an input unit 316, an output unit 317, a storage unit 318, a drive 319, an Ethernet interface (Ethernet I/F) 320, and a network terminal 321. It should be noted that "Ethernet" (in Japanese) and "Ethernet" (in English) are registered trademarks.

In this personal computer 310, the CPU 311, the ROM 312, and the RAM 313 are connected to each other via the bus 314. The bus 314 is further connected to the input and output interface 315. The input and output interface 315 is connected to the input unit 316, the output unit 317, the storage unit 318, and the drive 319.

The input unit 316 is constituted by a keyboard, a mouse, a microphone, and the like. The output unit 317 is constituted by a display, a speaker, and the like. The storage unit 318 is constituted by an HDD (Hard Disk Drive), a non-volatile memory, and the like. The drive 319 drives a removable medium such as a magnetic disk, an optical disk, a magneto-optical disk, or a memory card. The bus 314 is connected to an Ethernet interface 320. This Ethernet interface 320 is connected to the network terminal 321.

Figure 3:
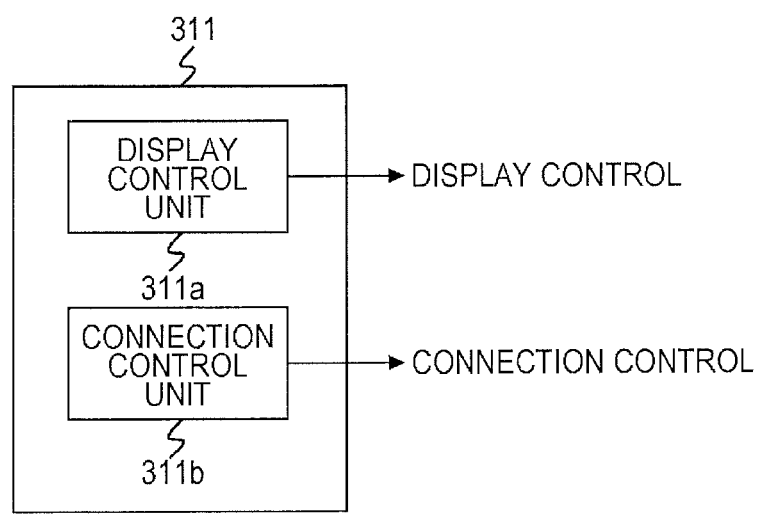
FIG. 3 is a figure illustrating a functional configuration of a CPU in the personal computer constituting the connection control apparatus.

In the personal computer 310 as shown in FIG. 2, the CPU 311 loads to the RAM 313 a program stored in, for example, the storage unit 318 via the input and output interface 315 and the bus 314, and executes the program, so that the CPU 311 performs display control of a user interface screen, and performs connection control between a source device and a destination device on the basis of operation performed with the user interface screen. In this case, the CPU 311 constitutes a display control unit 311a and a connection control unit 311b. FIG. 3 illustrates a functional configuration diagram of the CPU 311.

[Routing Screen]

Figure 4:
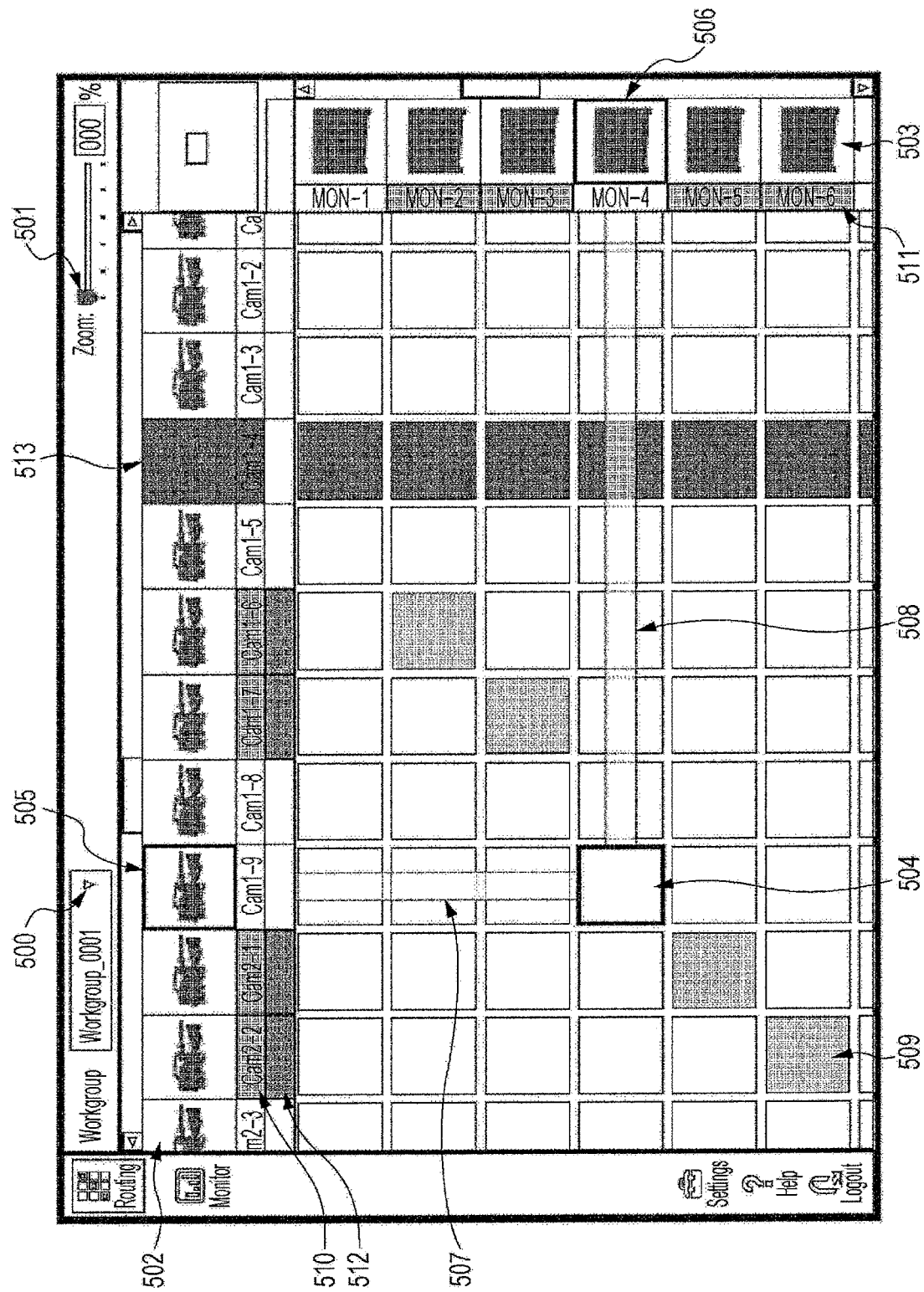
FIG. 4 is a figure illustrating an example of a routing screen which is one of user interface screens for operating a connection by designating a combination of any given source device and destination device.

FIG. 4 is a figure illustrating an example of a routing screen, which is one of user interface screens for operating a connection by designating a combination of any given source device and destination device, displayed on the connection control apparatus (the tablets 108, 206 and the personal computers 302, 402). This routing screen exists for each work group. By operating a button indicated by arrow 500 and selecting a desired work group from a pull down menu, the user can call a routing screen for that work group. In the example as shown in the drawing, "Workgroup_0001" is selected. This routing screen can be zoomed and displayed by operating a lever indicated by arrow 501.

This routing screen is arranged with multiple source devices and multiple destination devices in a matrix form. More specifically, on this routing screen, as indicated by arrow 502, multiple source devices are arranged in the upper portion in the horizontal direction. In this case, each source device is indicated by an icon, and a device name and the like can also be displayed. It should be noted that this icon can be replaced by any image prepared by the user.

On this routing screen, as indicated by arrow 503, multiple destination devices are arranged in the right portion in the vertical direction. In this case, each destination device is indicated by an icon, and a device name and the like can also be displayed. It should be noted that this icon can be replaced by any image prepared by the user.

Among the source devices and the destination devices displayed on the routing screen, a device in a state with which a connection cannot be established (inactive state) due to power off or mismatch of format is displayed in a display state different from other devices. In the example as shown in the drawing, as indicated by arrow 513, a camera "Cam 1-4" which is one of the source devices is in the inactive state, and the icon thereof is displayed, for example, overall darkly. At this occasion, the display of each cross point corresponding to this camera "Cam 1-4" is also different from other cross points and displayed, for example, darkly. Therefore, the user can previously find combinations of source devices and destination devices which cannot be connected, and can avoid selection of an incorrect or unconnectable combination.

When a mouse hover operation is performed at a cross point (cross point) between a predetermined source device and a predetermined destination device, the display mode of the cross point changes as indicated by arrow 504. In the example as shown in the drawing, a frame line of a rectangular frame at the cross point is displayed thickly. At this occasion, as indicated by arrows 505, 506, there is a change in the display modes of the source device and the destination device corresponding to the cross point. In the example as shown in the drawing, the frame line of the rectangular frame of the source device and destination device is displayed thickly.

At this occasion, in response to a mouse hover operation, a Y axis guide extending from the cross point to the corresponding source device as indicated by arrow 507 is displayed, and an X axis guide extending from the cross point to the corresponding destination device as indicated by arrow 508 is displayed. With such addition and change in the display caused in response to the mouse hover operation, the user can efficiently confirm the cross point position on which selection operation is to be performed, and the source device and the destination device connected by the selection operation.

When selection operation is performed to select the cross point by performing mouse click operation at the cross point where the above mouse hover operation is performed, this makes the cross point and further the corresponding source device and destination device be in the active state, so that the source device and the destination device are in the connected state. When the cross point is in the active state, the display of the cross point is in a state for indicating the active state as indicated by arrow 509. At this occasion, as indicated by arrow 510, the display of the source device is in a state for indicating the active state, and likewise, as indicated by arrow 511, the display of the destination device is in a state for indicating the active state.

With regard to the source device in the active state, a tally lamp is in an illuminating state according to the output of a video signal as indicated by arrow 512.

[Group routing (Group Routing) Screen]

Figure 5:
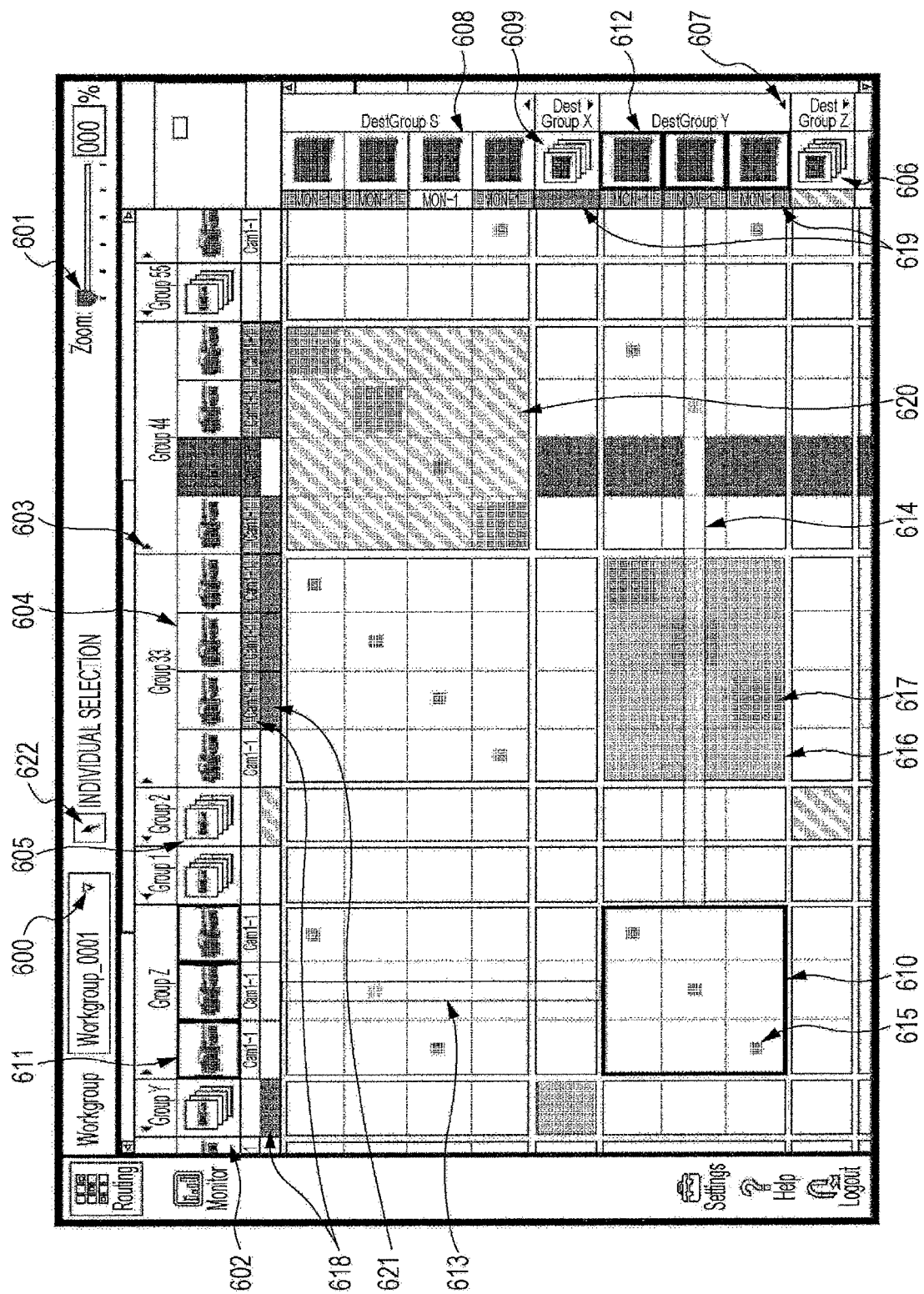
FIG. 5 is a figure illustrating an example of a group routing screen which is one of user interface screens for operating a connection by designating a combination of any given source device and destination device.

FIG. 5 is a figure illustrating an example of a group routing screen, which is one of user interface screens for operating a connection by designating a combination of any given source device and destination device, displayed on a connection control apparatus (the tablets 108, 206 and the personal computers 302, 402). This group routing screen exists for each work group. By operating a button indicated by arrow 600 and selecting a desired work group from a pull down menu, the user can call a group routing screen for that work group. In the example as shown in the drawing, "Workgroup_0001" is selected. This group routing screen can be zoomed and displayed by operating a lever indicated by arrow 601.

This group routing screen is arranged with multiple source devices and multiple destination devices in a matrix form. More specifically, on this routing screen, as indicated by arrow 602, multiple source devices are arranged in the upper portion in the horizontal direction. In this case, each source device is indicated by an icon, and a device name and the like can also be displayed. It should be noted that this icon can be replaced by any image prepared by the user.

In this case, source devices are displayed in each of groups registered in advance. In each group, expand/collapse operation of a group can be done by operating a button indicated by arrow 603. In "expand group", each source device included in the group is allocated to each column and is in a displayed state as indicated by arrow 604. On the other hand, in "collapse group", the source devices included in the group are in a state of being allocated to a single column as indicated by arrow 605. In this case, the display of the icon changes to an icon indicating that multiple source devices are included.

On this routing screen, as indicated by arrow 606, multiple destination devices are arranged in the right portion in the vertical direction. In this case, each destination device is indicated by an icon, and a device name and the like can also be displayed. It should be noted that this icon can be replaced by any image prepared by the user.

In this case, like the display of the source devices explained above, destination devices are displayed in each of groups registered in advance. In each group, expand/collapse operation of a group can be done by operating a button indicated by arrow 607. In "expand group", each source device included in the group is allocated to each column and is in a displayed state as indicated by arrow 608. On the other hand, in "collapse group", the source devices included in the group are in a state of being allocated to a single column as indicated by arrow 609. In this case, the display of the icon changes to an icon indicating that multiple source devices are included.

The cross points (cross points) of a predetermined number of corresponding devices of a source device group and a destination device group registered in advance are made into groups. Therefore, when a mouse hover operation is performed at a grouped cross point (hereinafter referred to as "cross point group" as necessary), a display indicating a range of the cross point group is shown as indicated by arrow 610. In the example as shown in the drawing, the frame line of the rectangular frame indicating the range of the cross point group is thickly displayed.

At this occasion, as indicated by arrows 611, 612, there is a change in the display modes of the source devices and the destination devices corresponding to the cross point group. In the example as shown in the drawing, the frame lines of the rectangular frames of the source devices and the destination devices are displayed thickly. At this occasion, in response to a mouse hover operation, a Y axis guide extending from the cross point group to the corresponding source devices as indicated by arrow 613 is displayed, and an X axis guide extending from the cross point group to the corresponding destination devices as indicated by arrow 614 is displayed.

With such addition and change in the display caused in response to the mouse hover operation, the user can efficiently confirm the position of the cross point group on which selection operation is to be performed, and the source devices and the destination devices connected by the selection operation. In the range of the cross point group in which both of the source device groups and the destination device groups are in expanded state, marks as indicated by arrow 615 are displayed to indicate cross points that are to be in the active state when the selection operation of the cross point group is performed.

When selection operation is performed to select the cross point group by performing mouse click operation at the cross point group where the above mouse hover operation is performed, this makes the cross point group and further the corresponding source device group and destination device group be in the active state, so that the corresponding devices are in the connected state. In this case, the connection between the devices is considered to be in accordance with a rule that the combination of the source devices and the destination devices are set in the direction from the upper right to the lower left.

Therefore, in an editing screen (see FIG. 6) explained later, editing is performed to switch the order of the devices in the source device group or the destination device group, so that a connection combination of the devices in the source device group and the devices in the destination device group can be changed.

When the cross point group is in the active state, the display of the cross point group changes to a state indicating the active state as indicated by arrow 616. For example, the display is converted from the black color state to the blue color. As indicated by arrow 617, a mark indicating a cross point in the active state is displayed in a large size. At this occasion, the source device group or the source devices in the group are displayed in a state for indicating the active state as indicated by arrows 618, and likewise, the destination device group or the destination devices in the group are displayed in a state for indicating the active state as indicated by arrows 619. For example, the display is converted from the black color state to the blue color.

As indicated by arrow 620, when some of the cross points in the cross point group are in the inactive state, the display of the cross point group is in a mode different from the display where all the cross points in the cross point group are in the active state (see the display of the cross point group indicated by arrow 616). For example, the display may be in a hatched state.

Cases where some of the cross points in a cross point group are in the inactive state may include a case where the source device group includes, for example, a source device that has been turned off and disconnected from the network, or a case where the destination device group includes, for example, a destination device that has been turned off and disconnected from the network.

Alternatively, a case where some of the cross points in a cross point group are in the inactive state may include a case where a predetermined cross point is in the inactive state under control of another connection control apparatus.

It should be noted that such change of the display of the cross point group is performed even in a case where, for example, editing is performed to switch the order of the devices in the source device group or the destination device group under control of another connection control apparatus, and it is not in accordance with a rule of setting a combination of source devices and destination devices in a direction from the upper right to the lower left With regard to the source device in the active state, a tally lamp is in an illuminating state according to the output of a video signal as indicated by arrow 621. By operating an individual selection button indicated by arrow 622, selection operation for temporarily selecting each of individual cross points can be performed.

[Device Group Editing Screen]

Figure 6:
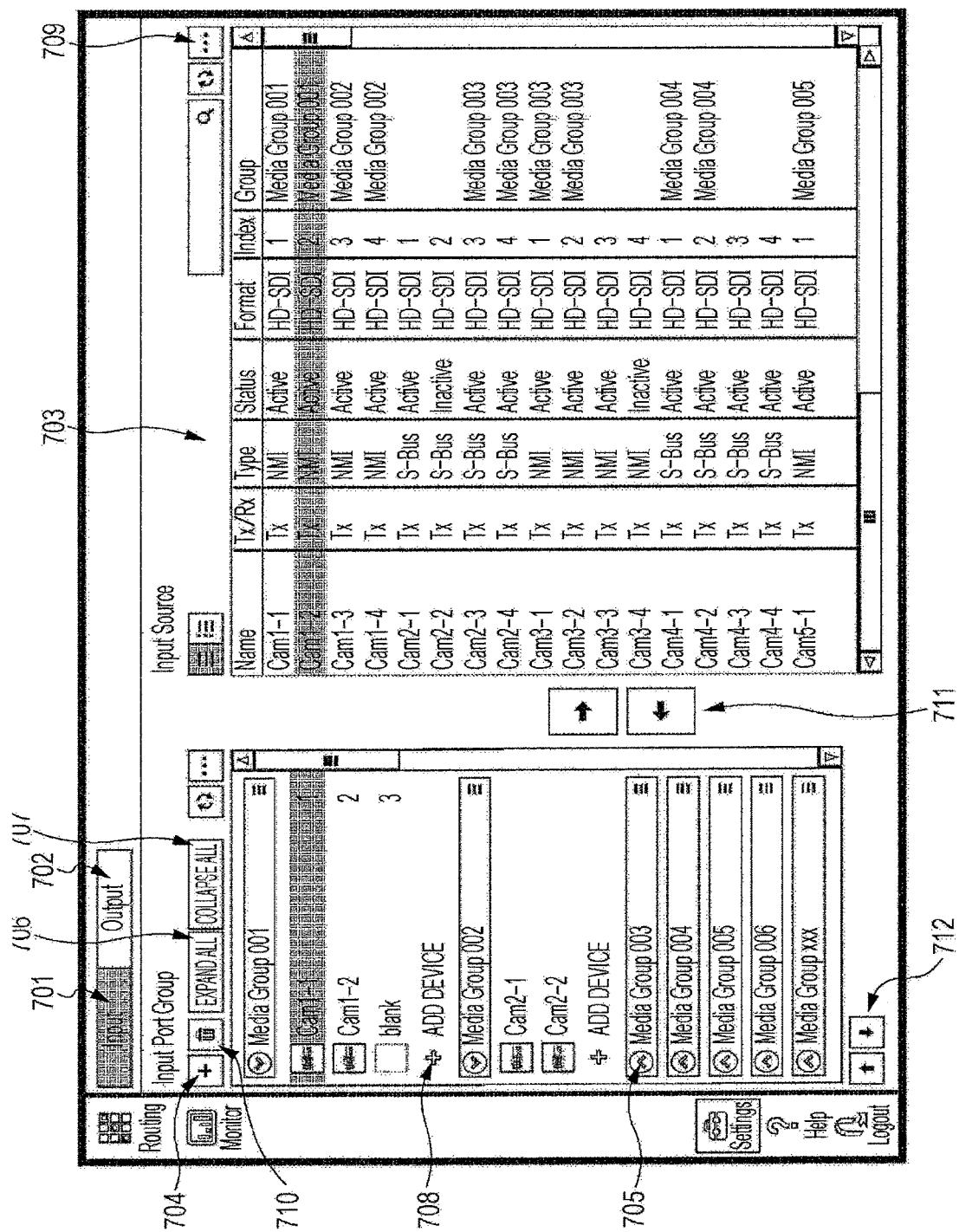
FIG. 6 is a figure illustrating an example of a device group editing screen which is one of the user interface screens.

FIG. 6 is a figure illustrating an example of a device group editing screen, which is one of the user interface screens, displayed on a connection control apparatus (the tablets 108, 206 and the personal computers 302, 402). This example shows an editing screen of a source device group. By operating an "Input" button indicated by arrow 701, an editing screen of a source device group is shown. On the other hand, by operating an "Output" button indicated by arrow 702, an editing screen of a destination device group is shown. In this case, the editing screen of the source device group will be explained, but the editing screen of the destination device group is also similar.

At the right side of the screen, a list of source devices connected to the network is displayed as indicated by arrow 703. By operating a "+" button indicated by arrow 704, a new group can be generated. In the example as shown in the drawing, groups from "Media Group 001" to "Media Group xxx" are already generated.

By operating a button indicated by arrow 705 in a group item, the group can be expanded and collapsed. In the example as shown in the drawing, "Media Group 001" and "Media Group 002" are expanded, and the other groups are collapsed. By operating "expand all" button indicated by arrow 706, all the groups can be changed to an expanded state. By operating "collapse all" button indicated by arrow 707, all the groups can be changed to a collapsed state.

When a desired source device is dragged from the source device list and dropped to each group in an expanded state, the source device can be added thereto. By operating an "add device" button indicated by arrow 708, the source device selected in the source device list can be added. By operating a "context menu" button in the source device list indicated by arrow 709, a blank can be generated.

The order of source devices and the blanks in the group can be switched by drag and drop operation. A predetermined source device or blank existing in the group can be deleted by operating a "delete" button indicated by arrow 710 while the delete target is in a selected state. By using this "delete" button, an unnecessary group can be deleted according to the same operation. By performing drag and drop operation, a group item portion can be moved upward and downward, and the order of the groups can be changed.

"Left arrow" and "right arrow" buttons indicated by arrow 711 are buttons for adding/deleting a selected source device. "Upward arrow" and "downward arrow" buttons indicated by arrow 712 are buttons for operating upward/downward movement of a source device or a group selected.

[Session list (Session List) Screen]

Figure 7:
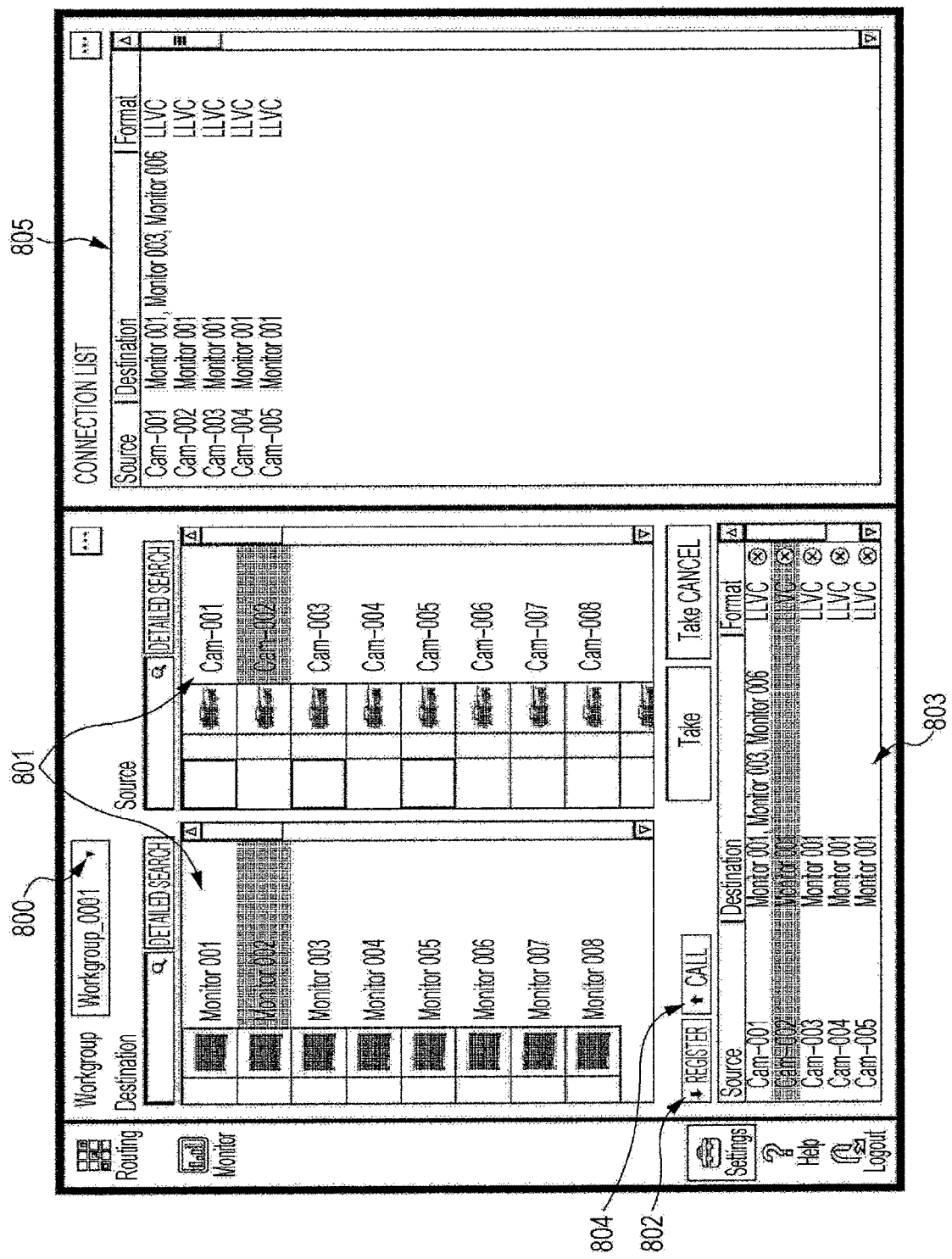
FIG. 7 is a figure illustrating an example of a session list screen which is one of user interface screens for operating a connection by designating a combination of any given source device and destination device.

FIG. 7 is a figure illustrating an example of a session list screen, which is one of user interface screens for operating a connection by designating a combination of any given source device and destination device, displayed on a connection control apparatus (the tablets 108, 206 and the personal computers 302, 402). This session list screen is the most primitive screen for displaying source devices and destination devices in a list format, and selecting a cross point (cross point).

This session list screen exists for each work group. By operating a button indicated by arrow 800 and selecting a desired work group from a pull down menu, the user can call a session list screen for that work group. In the example as shown in the drawing, "Workgroup_0001" is selected.

As indicated by arrows 801, at the left side in the upper portion of the screen, lists of source devices and destination devices connected to the network are displayed. After a combination of source devices and destination devices is selected in this list, a "registration" button indicated by arrow 802 is operated, so that the combination can be registered. A connection between the source device and the destination device is controlled on the basis of this registration. In this case, when a predetermined destination device is selected from a display portion of destination devices, source devices are narrowed down to those that can be connected with the predetermined destination device and displayed in the display portion of the source devices. Therefore, the user can select only the source devices that can be connected to the predetermined destination device, and can avoid selection of an incorrect or unconnectable combination.

The display indicated by arrow 803 shows a combination of source devices and destination devices registered. After a combination of a source device and a destination device registered is selected, a "call" button indicated by arrow 804 is operated, whereby the combination can be called into the list. At the right side of the screen, as indicated by arrow 805, combinations of the source devices and the destination devices which are currently active, i.e., connected, are displayed.

Figure 8:
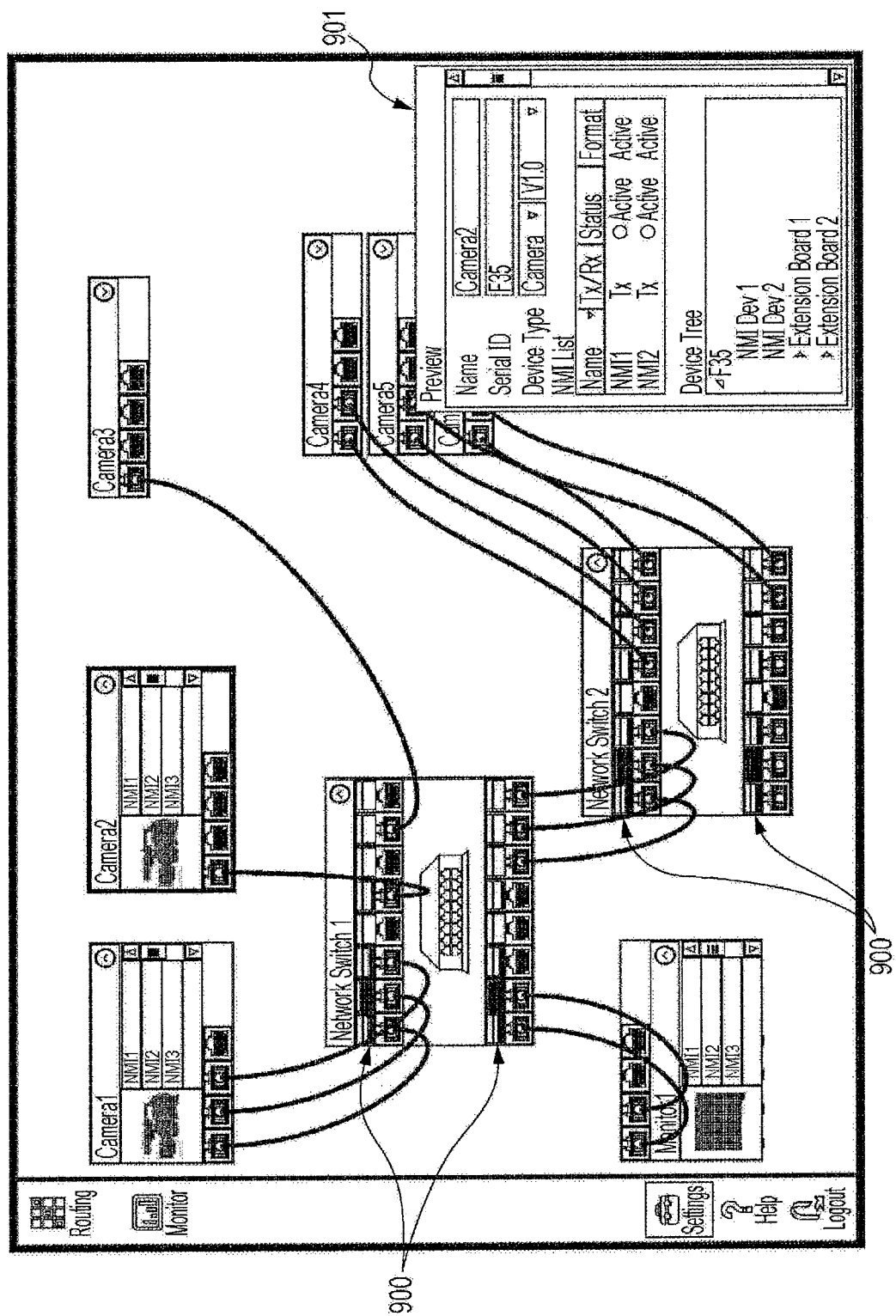
FIG. 8 is a figure illustrating an example of a topology map screen which is one of the user interface screens.

FIG. 8 is a figure illustrating an example of a topology map (Topology map) screen, which is one of the user interface screens, displayed by a connection control apparatus (the tablets 108, 206 and the personal computers 302, 402). This screen is a screen for listing the connection state of the network and the load imposed on each terminal. This example shows a case where a network is constituted by multiple cameras serving as source devices, a single monitor serving as a destination device, and two switching hubs (network switches).

As indicated by arrows 900, load display units are provided in association with the terminals of the inputs and outputs of the switching hub, and in the load display unit, the load of each terminal is displayed by the amount of stacked horizontal bars (for example, bars in green color). The user can view the current connection state of the network by seeing this topology map screen. In addition, the user can view the state of the load of each terminal at the input and output of the switching hub by seeing this topology map screen, and when the load is high, the user can take a measure such as replacing the cable connected to the terminal with a thicker cable so that a sufficient bandwidth can be ensured.

In this topology map screen, by clicking the display portion of each device with a mouse, the property of the device can be displayed. In the example as shown in the drawing, as indicated by arrow 901, the property of the camera 2 (Camera 2) is displayed.

As described above, in the video system 10 as shown in FIG. 1, the connection control apparatus (the tablets 108, 206 and the personal computers 302, 402) can display the group routing screen (see FIG. 5) as a user interface screen. Then, the user performs selection operation for selecting a desired cross point group on this group routing screen, so that a predetermined number of corresponding devices can be connected at a time. Therefore, it is not necessary for the user to repeat the connection operation the predetermined number of times, and this can improve the user's convenience.

2. Modification

In the above embodiment, an example where the present technique is applied to the video system in the broadcast station has been shown. It is to be understood that the present technique can also be applied to similar video systems in the medical and educational fields in the same manner.

The present technique may also be configured as follows.

(1) A display apparatus comprising: circuitry configured to: display a user interface screen including device information that identifies a plurality of output device groups and a plurality of input device groups, each said output device group including one or more output devices configured to output signals, each said input device group including one or more input devices configured to receive the signals output by the output devices, and the user interface screen being to control connection between one of the output device groups and one of the input device groups; and receive an input that designates a combination of said one of the output device groups and said one of the input device groups from among the plurality of the output device groups and the plurality of the input device groups, wherein the user interface screen includes a matrix comprising a plurality of cells in a row direction and a column direction, each of the plurality of cells corresponding to a combination of one said output device and one said input device in the matrix, the input designates the combination of said one of the output device groups and said one of the input device groups by designating one of grouped cells corresponding to the combination of said one of the output device groups and said one of the input device groups in the matrix, and the grouped cells are grouped such that the input designates the combination of said one of the output device groups and said one of the input device groups as a group.

(2) The display apparatus according to (1), wherein in a case that hover operation is performed on one of the grouped cells, the circuitry indicates a range of said one of the grouped cells on the user interface screen.

(3) The display apparatus according to (2), wherein in the case that the hover operation is performed on said one of the grouped cells, the circuitry changes a display mode of the device information displayed on the user interface screen corresponding to said one of the grouped cells.

(4) The display apparatus according to (3), wherein in a case that selection operation is performed on said one of the grouped cells, the circuitry changes a display of the range of said one of the grouped cells on the user interface screen to another display of the range different from the display of the range in the case that the hover operation is performed.

(5) The display apparatus according to (4), wherein in a case that at least one output device in said one of the output device groups corresponding to said designated one of grouped cells is disconnected from a network, or in a case that at least one input device in said one of the input device groups corresponding to said designated one of grouped cells is disconnected from the network, the circuitry changes the display of the range of said one of the grouped cells on the user interface screen after the selection operation is performed to another display of the range different from the display of the range in a case that all the input devices and output devices corresponding to said designated one of grouped cells are connected to the network.

(6) The display apparatus according to (5), wherein in a case that a connection between at least one output device in said one of the output device groups corresponding to said designated one of grouped cells and at least one input device in said one of the input device groups corresponding to said designated one of grouped cells is disconnected, the circuitry changes the display of the range of said one of the grouped cells on the user interface screen after the selection operation is performed to another display of the range different from the display of the range in a case that all the input devices and output devices corresponding to said designated one of grouped cells are connected to one another.

(7) The display apparatus according to any of (1) to (6), wherein the circuitry is configured to switch a displaying order of input devices in the input device group or a displaying order of output devices in the output device group on the user interface screen.

(8) The display apparatus according to any of (1) to (7), wherein the circuitry is configured to display a tally lamp in association with each of the output devices on the user interface screen.

(9) The display apparatus according to any of (1) to (8), wherein the circuitry controls the connection between said one of the output device groups and said one of the input device groups based on the input.

(10) A display method comprising: displaying, using circuitry, a user interface screen including device information that identifies a plurality of output device groups and a plurality of input device groups, each said output device group including one or more output devices configured to output signals, each said input device group including one or more input devices configured to receive the signals output by the output devices, and the user interface screen being to control connection between one of the output device groups and one of the input device groups; and receiving an input that designates a combination of said one of the output device groups and said one of the input device groups from among the plurality of the output device groups and the plurality of the input device groups, wherein the user interface screen includes a matrix comprising a plurality of cells in a row direction and a column direction, each of the plurality of cells corresponding to a combination of one said output device and one said input device in the matrix, the input designates the combination of said one of the output device groups and said one of the input device groups by designating one of grouped cells corresponding to the combination of said one of the output device groups and said one of the input device groups in the matrix, and the grouped cells are grouped such that the input designates the combination of said one of the output device groups and said one of the input device groups as a group.

(11) A non-transitory computer readable medium including executable instructions, which when executed by a computer cause the computer to: display a user interface screen including device information that identifies a plurality of output device groups and a plurality of input device groups, each said output device group including one or more output devices configured to output signals, each said input device group including one or more input devices configured to receive the signals output by the output devices, and the user interface screen being to control connection between one of the output device groups and one of the input device groups; and receive an input that designates a combination of said one of the output device groups and said one of the input device groups from among the plurality of the output device groups and the plurality of the input device groups, wherein the user interface screen includes a matrix comprising a plurality of cells in a row direction and a column direction, each of the plurality of cells corresponding to a combination of one said output device and one said input device in the matrix, the input designates the combination of said one of the output device groups and said one of the input device groups by designating one of grouped cells corresponding to the combination of said one of the output device groups and said one of the input device groups in the matrix, and the grouped cells are grouped such that the input designates the combination of said one of the output device groups and said one of the input device groups as a group.

(12) A connection control apparatus for controlling connecting between a source device and a destination device connected to a network, the connection control apparatus including: a display control unit configured to display a user interface screen for operating connection by designating a combination of any given source device and destination device from a predetermined number of the source devices and a predetermined number of the destination devices; and a connection control unit configured to control connection between the source device and the destination device on the basis of operation performed with the user interface screen, wherein on the user interface screen, a plurality of source devices are disposed in one of row/column directions, and a plurality of destination devices are disposed in the other direction thereof, cross points of a predetermined number of devices corresponding to a source device group and a destination device group registered in advance are made into a group, and when selection operation is performed to select the cross points made into the group on the user interface screen, the connection control unit performs control so as to connect the predetermined number of devices with each other at a time.

REFERENCE SIGNS LIST

10 Video system
101, 102, 201, 202 Camera
103 Video playback device
104, 105, 203, 204 Monitor
106 Video recording device
107, 205, 301 Switching hub
108, 206 Tablet
302, 310, 402 Personal computer
401 The Internet

The invention claimed is:

1. A display apparatus, comprising:
   circuitry configured to
      display a user interface screen including device information that identifies a plurality of output devices and a plurality of input devices, the plurality of output devices and the plurality of input devices being operably coupled to the display apparatus, the user interface screen controlling a connection between one of the plurality of output devices and one of the plurality of input devices; and
      receive an input that designates a combination of the one of the plurality of output devices and the one of the plurality of input devices among the plurality of the output devices and the plurality of the input devices, respectively, wherein
   the user interface screen includes a matrix comprising
      a plurality of cells in a row direction and a column direction, one of the plurality of cells corresponding to the combination of the one of the plurality of output devices and the one of the plurality of input devices in the matrix,
      a plurality of first images, each image being corresponding to a corresponding input device of the plurality of input devices,
      a plurality of second images, each image corresponding to a corresponding output method by the plurality of output devices, at least one of the plurality of second images including multiple output methods as a group, and a plurality of indicators configured to indicate whether a video signal of each of the plurality of input devices is being outputted, the plurality of indicators and the plurality of input devices having a one-to-one correspondence, the plurality of indicators being arranged at an edge of the matrix perpendicular to the plurality of second images, and the input designates the combination of the one of the plurality of output devices and the one of the plurality of input devices by designating the one of the plurality of cells corresponding to the combination of the one of the plurality of output devices and the one of the plurality of input devices in the matrix, wherein when an input device of the plurality of input devices is inactive, a first image of the plurality of first images corresponding to the input device of the plurality of input devices is displayed with a different indication that others of the plurality of first images, and cells of the matrix on a row corresponding to the first image of the plurality of first images are displayed with the different indication.

2. The display apparatus according to claim 1, further comprising:

a touch panel on the display apparatus, wherein the circuitry is further configured to receive the designation of the combination of the one of the output devices and the one of the input devices by detecting a touch on the one of the plurality of cells.

3. The display apparatus according to claim 1, wherein the plurality of input devices and the plurality of output devices are operably coupled to the display apparatus via an Ethernet network.

4. The display apparatus according to claim 1, wherein the circuitry is further configured to detect status information of the plurality of input devices, and the plurality of images are displayed in a different manner based on the status information.

5. The display apparatus according to claim 4, wherein the status information indicates at least whether the one of the plurality of input devices is active or inactive.

6. The display apparatus according to claim 1, wherein the plurality of indicators include a plurality of tally lamps corresponding to the plurality of input devices.

7. The display apparatus according to claim 1, wherein each image of the plurality of first images represents an input signal of the corresponding input device from an input source.

8. A system, comprising:

a display apparatus, the display apparatus including circuitry configured to display a user interface screen including device information that identifies a plurality of output devices and a plurality of input devices, the plurality of output devices and the plurality of input devices being operably coupled to the display apparatus, the user interface screen controlling a connection between one of the plurality of output devices and one of the plurality of input devices; and receive an input that designates a combination of the one of the plurality of output devices and the one of the plurality of input devices among the plurality of the output devices and the plurality of the input devices, respectively, wherein the user interface screen includes a matrix comprising a plurality of cells in a row direction and a column direction, one of the plurality of cells corresponding to the combination of the one of the plurality of output devices and the one of the plurality of input devices in the matrix, a plurality of first images, each image being corresponding to a corresponding input device of the plurality of input devices, a plurality of second images, each image corresponding to a corresponding output method by the plurality of output devices, at least one of the plurality of second images including multiple output methods as a group, and a plurality of indicators configured to indicate whether a video signal of each of the plurality of input devices is being outputted, the plurality of indicators having a one-to-one correspondence with the plurality of input devices, the plurality of indicators being arranged at an edge of the matrix perpendicular to the plurality of second images, and the input designates the combination of the one of the plurality of output devices and the one of the plurality of input devices by designating the one of the plurality of cells corresponding to the combination of the one of the plurality of output devices and the one of the plurality of input devices in the matrix, the plurality of input devices and the plurality of output devices, and a switching hub operably coupled to each of the plurality of input devices, each of the plurality of output devices, and the display apparatus via an Ethernet interface, wherein when an input device of the plurality of input devices is inactive, a first image of the plurality of first images corresponding to the input device of the plurality of input devices is displayed with a different indication that others of the plurality of first images, and cells of the matrix on a row corresponding to the first image of the plurality of first images are displayed with the different indication.

9. The system according to claim 8, wherein the video signal is transmitted from the one of the plurality of input devices to the one of the plurality of output devices according to the designation, via an Ethernet connection.

10. The system according to claim 8, further comprising:

a touch panel on the display apparatus, wherein the circuitry is further configured to receive the designation of the combination of the one of the output devices and the one of the input devices by detecting a touch on the one of the plurality of cells.

11. The system according to claim 8, wherein the plurality of input devices and the plurality of output devices are operably coupled to the display apparatus via an Ethernet network.

12. The system according to claim 8, wherein the circuitry is further configured to detect status information of the plurality of input devices, and the plurality of images are displayed in a different manner based on the status information.

13. The system according to claim 12, wherein the status information indicates at least whether the one of the plurality of input devices is active or inactive.

14. The system according to claim 8, wherein the plurality of indicators include a plurality of tally lamps corresponding to the plurality of input devices.

15. The system according to claim 8, wherein
each image of the plurality of first images represents an input signal of the corresponding input device from an input source.

\* \* \* \* \*